INVENTOR
Robert B. Cox

BY Krafft & Wells
ATTORNEYS

3,516,643
ELECTRIC FENCE
Robert B. Cox, Rte. 1, Corning, Iowa 50841
Filed Mar. 24, 1969, Ser. No. 809,494
Int. Cl. A01k *3/00*
U.S. Cl. 256—10      5 Claims

ABSTRACT OF THE DISCLOSURE

A wire bracket adapted to have its upper end looped over the upper end of a fence post and hanging downwardly therefrom at an angle to the post and away from the fence, the lower end of the wire carrying an electric insulator for supporting a bare metal wire above the ground and parallel to but spaced from the fence.

BACKGROUND OF THE INVENTION

The field of the invention is electric fences and the present invention is particularly concerned with an improved insulator extender bracket therefor.

According to the present invention, an electrically charged wire is attached to a new or existing fence such as board, barbed wire or woven wire. Fattening cattle have a tendency to rub on the fences and mash them down, regardless of how new and tight they are. A properly installed electric fence instills fear in all kinds of livestock and destruction of the fence is avoided.

In the spring and summer of the year when green weeds and grass grow up and touch the charged wire, the wire is shorted out and becomes ineffective.

The state of the prior art fence extenders may be ascertained by reference to U.S. Pat. 2,429,029 of Newbern which discloses an electric fence bracket for attachment to a T-shape steel post.

SUMMARY OF THE INVENTION

The invention relates to an electric fence for repelling livestock and comprises a bare metal wire supported on insulators that are kept by wire brackets high enough above the ground and far enough away from the fence to permit grass and weeds that may grow beneath the wire to be cut down by a mower.

BRIEF DESCRIPTION OF THE DRAWING

The invention will now be described more in detail with reference to the drawing wherein.

DESCRIPTION OF THE PREFERRED EMBODIMENTS

Figure 1:
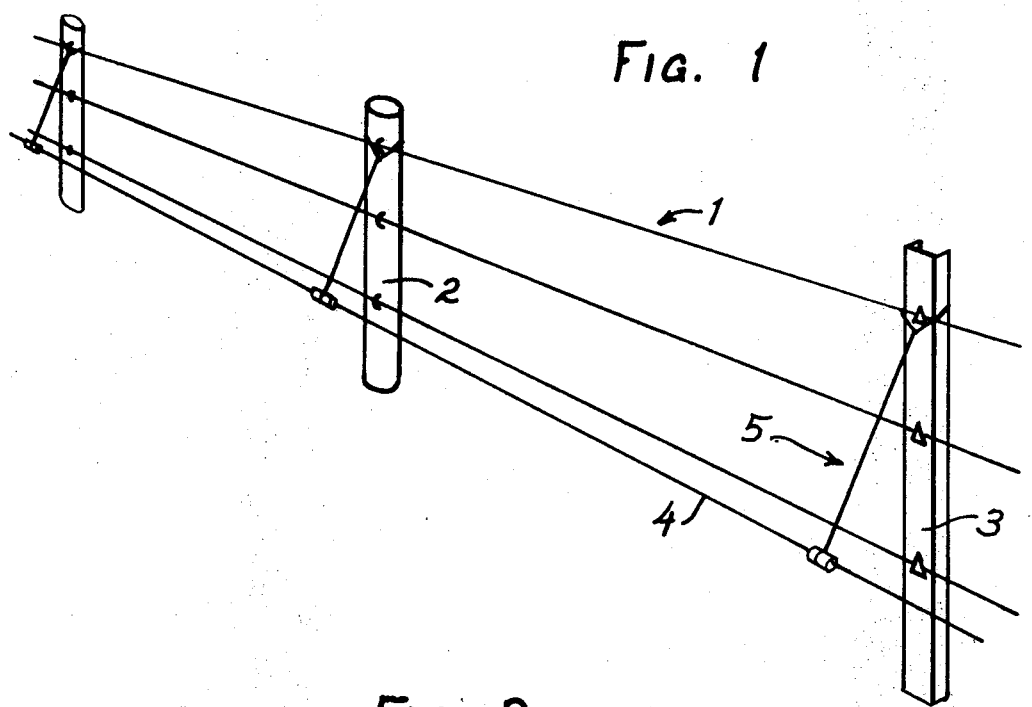
FIG. 1 is a perspective view of a portion of a fence with the electrified wire attached thereto by wire brackets.
Figure 2:
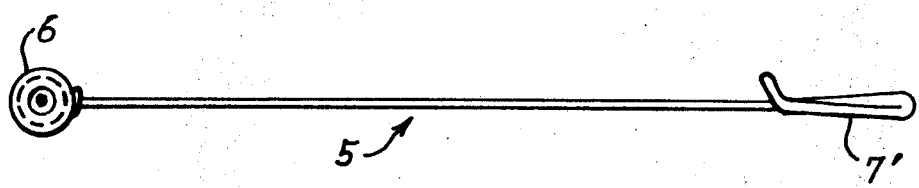
FIGS. 2 and 3 show different forms of such wire brackets.
Figure 3:
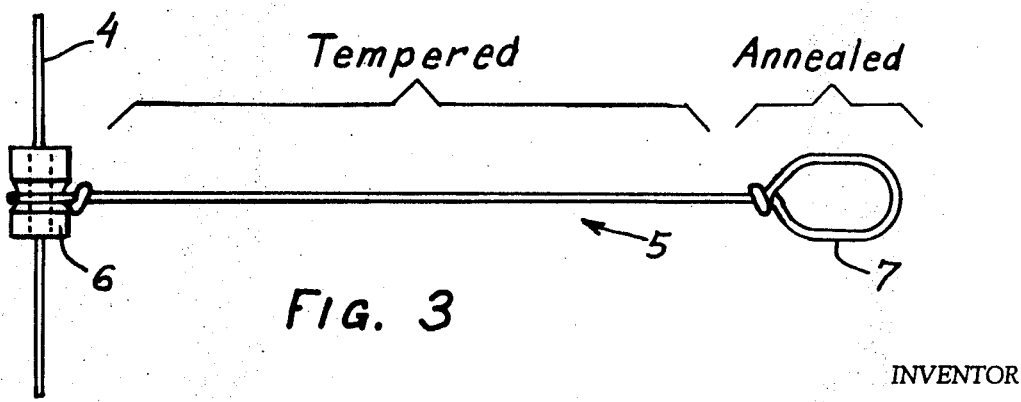

The fence that is to be electrified by the present invention can be of almost any kind. If it is a wire fence 1 with either wooden posts 2 or steel posts 3, then such posts usually extend a short distance above the level of the uppermost wire so as to provide a free end on which the electric wire 4 and its supporting bracket 5 can be hung. The supporting bracket 5 is preferably made of tempered spring steel throughout the greater portion of its length, but its two ends are preferably annealed so as to be more readily pliable than the middle portion, and so that one end can be wrapped around a hollow tubular insulator 6 to support an electric wire 4 therein while the other end can be formed into a loop 7 to be hung over the upper end of one of the fence posts 2 or 3. In a preferred embodiment, the bracket 5 is a mild steel wire or rod ¼" in diameter. If the fence is of the woven wire type, it may be advantageous to leave the loop open, as shown in FIG. 2 at 7', so as to present a free end which can be threaded through the wire meshes or to permit its attachment somewhere along the middle of the post where there is no free end on which it can be hung.

The bracket attaches itself to the post by what may be called a "pivot bind" or "torsion-lock." The bracket is simply placed over the top of the post and the top wire or board determines where it hangs with one end of loop 7 contacting the post at a given level in the rear and the other end of the loop contacting the post in the front at a lower level. The weight of the bracket, the attached insulator and the electric wire bind the bracket to the post.

The bracket 5 hangs downwardly from the fence at an angle of about 30 to 45° which is sufficient to prevent accidental contact of the electric wire with the other wires or metal parts of the fence and also spaces the electric wire away from the fence a foot or two to permit the cutter bar of a mowing machine to cut down grass and weeds under the electric wire while traveling along the fence.

If the end portions of the wire bracket are sufficiently annealed, then the distance of the electric wire above the ground and away from the fence, as well as the axial alignment of the insulators with one another, is easily regulated, and when the electric wire is to be removed, it is first drawn in the axial direction out of the axially aligned insulators and the brackets are then collected and wrapped into a compact bundle.

What is claimed is:

1. A wire or rod bracket for supporting an electrically charged wire along the side of a fence and spaced a short distance therefrom, said bracket comprising a single piece of mild steel having end portions, one of which has an insulator for supporting an electrically charged wire attached thereto, while the other end is formed into a loop to be placed over the free end of a fence post said loop having an outer end contacting said post at a given level in the rear and the other end of said loop contacting the post in the front at a lower level so that the bracket as a whole hangs downwardly from the upper part of the fence at an angle to the vertical plane of the fence and the loop is bound to the fence post by a torsion-lock.

2. The wire or rod bracket of claim 1, in which said loop is open so as to present a free end which is threadable through the mesh of a woven wire fence and permits its attachment somewhere along the middle of a fence post where there is no free end.

3. The wire bracket of claim 1, in which said insulator is hollow and tubular for insertion of the electrical wire.

4. The wire bracket of claim 1, in which the middle portion of the bracket is tempered spring steel and the end portions are annealed.

5. The wire or rod bracket of claim 1, in combination with a fence post and an electrically charged wire wherein the loop is bound to the fence post by the weight of said wire and the bracket maintains an angle of about 30 to 40 degrees with the fence post.

References Cited

UNITED STATES PATENTS

| | | | |
|---|---|---|---|
| 1,859,509 | 5/1932 | Haverstick | 256—1 |
| 2,163,954 | 6/1939 | Lucas | 256—10 X |
| 2,429,029 | 10/1947 | Newbern. | |
| 2,626,304 | 1/1953 | Telecky et al. | 256—10 X |
| 2,735,883 | 2/1956 | Larson | 256—10 X |
| 2,856,159 | 10/1958 | Braddock | 256—32 |
| 2,865,609 | 12/1958 | Steiner | 256—10 |

DENNIS L. TAYLOR, Primary Examiner

U.S. Cl. X.R.

256—32